(12) United States Patent
Hadon et al.

(10) Patent No.: US 10,744,055 B2
(45) Date of Patent: Aug. 18, 2020

(54) DEVICE FOR DETECTING THE POSITION OF MOVABLE OPERATING TABLE COMPONENTS

(71) Applicant: MAQUET GMBH, Rastatt (DE)

(72) Inventors: Stefanie Hadon, Karlsruhe (DE); Peter Harlacher, Bühl (DE); Winfried Wild, Karlsruhe (DE)

(73) Assignee: MAQUET GMBH, Rastatt (DE)

( * ) Notice: Subject to any disclaimer, the term of this patent is extended or adjusted under 35 U.S.C. 154(b) by 228 days.

(21) Appl. No.: 15/885,810

(22) Filed: Jan. 31, 2018

(65) Prior Publication Data

US 2018/0221231 A1   Aug. 9, 2018

Related U.S. Application Data

(63) Continuation-in-part of application No. PCT/EP2016/067489, filed on Jul. 22, 2016.

(30) Foreign Application Priority Data

Jul. 31, 2015   (DE) .................. 10 2015 009 990

(51) Int. Cl.
*A61G 13/10* (2006.01)
*A61G 13/08* (2006.01)
(Continued)

(52) U.S. Cl.
CPC ............ *A61G 13/10* (2013.01); *A61G 13/02* (2013.01); *A61G 13/08* (2013.01);
(Continued)

(58) Field of Classification Search
CPC ...................................... H01C 10/38
See application file for complete search history.

(56) References Cited

U.S. PATENT DOCUMENTS 3,772,629 A * 11/1973 Meylan-Rochat ..... H01C 10/00
                                                         338/154
4,651,123 A *  3/1987 Zepp ...................... H01C 10/38
                                                         338/154
(Continued)

FOREIGN PATENT DOCUMENTS

CN    201921065 U    8/2011
DE    3520199 A1     4/1986
(Continued)

OTHER PUBLICATIONS

International Search Report (with English translation) and Written Opinion dated Oct. 10, 2016 issued for PCT/EP2016/067489, 10 pages.
(Continued)

*Primary Examiner* — Eric J Kurilla
*Assistant Examiner* — James T Coble

(57) ABSTRACT

A device for detecting the position of movable operating table components that has a multilayer sensor film that is attached to a first operating table component; a slider that is mounted on a second operating table component which is movable relative to the first operating table component, the slider being equipped with a pressure piece that elastically compresses the multilayer sensor film; and -n electrical circuit, which generates a signal in accordance with the position of the pressure piece on the sensor film.

15 Claims, 3 Drawing Sheets

(51) Int. Cl.
    *G01D 5/165* (2006.01)
    *A61G 13/02* (2006.01)
    *F15B 15/28* (2006.01)

(52) U.S. Cl.
    CPC ......... *F15B 15/2853* (2013.01); *G01D 5/165* (2013.01); *A61G 2203/30* (2013.01); *A61G 2203/42* (2013.01); *A61G 2203/72* (2013.01)

(56) References Cited

U.S. PATENT DOCUMENTS

| | | | | |
|---|---|---|---|---|
| 4,865,303 A | * | 9/1989 | Hall | A61G 13/04 5/614 |
| 4,903,002 A | | 2/1990 | Sachsse | |
| 9,861,740 B2 | * | 1/2018 | Adams | A61M 5/1452 |
| 2006/0080777 A1 | * | 4/2006 | Rocher | A61G 13/08 5/618 |
| 2008/0127739 A1 | * | 6/2008 | DeAngelis | G01L 1/146 73/718 |
| 2011/0107516 A1 | * | 5/2011 | Jackson | A61G 13/08 5/608 |
| 2013/0206149 A1 | * | 8/2013 | Spendley | A61G 13/08 128/845 |

FOREIGN PATENT DOCUMENTS

| | | |
|---|---|---|
| DE | 102007059988 A1 | 6/2009 |
| DE | 102013105869 A1 | 12/2014 |
| EP | 0284787 A2 | 10/1988 |
| GB | 2393797 A | 4/2004 |

OTHER PUBLICATIONS

Chinese Office Action and Chinese Search Report (with English translation) dated Oct. 28, 2019 during the prosecution of corresponding Chinese Patent Application No. 201680052873.4, 16 pages.

* cited by examiner

DEVICE FOR DETECTING THE POSITION OF MOVABLE OPERATING TABLE COMPONENTS

CROSS REFERENCE TO RELATED APPLICATIONS

The present application is a continuation-in-part filed under 35 U.S.C. § 111(a), and claims the benefit under 35 U.S.C. § 365(c) of PCT International Application No. PCT/EP2016/067489, filed Jul. 22, 2016, which designates the United States of America, and claims the benefit of German Patent Application No. 10 2015 009 990.6, filed Jul. 31, 2015. The disclosure of each of these applications is incorporated by reference herein in its entirety.

TECHNICAL FIELD

Embodiments of the present disclosure relate to a device for detecting the position of movable components of an operating table.

BACKGROUND

The patient bearing surface of an operating table may be changed in its shape and position by actuating various actuators to set an optimal supporting position for a specific operation or treatment of the patient. In the case of operating tables having multiple joints, the risk of collisions of individual operating table components with one another increases with each adjustment element. Above all, the components leg plate, back plate, table column, or table base are at risk. The user may damage table parts and at the same time also injure the supported patient due to inattention or due to incorrect operation.

To reduce the risk of collisions, sensors can be installed in the operating table to detect the adjustment movements of the table components and relay them to an electronic controller. This controller computes a possible imminent collision or an incorrect setting from the sensor values and stops the adjustment movement if there is a risk of collision, in order to avoid damage to the table or patient.

For certain positions, complete profiles can be preprogrammed or prepared by the user himself, and then retrieved using a single button press. Therefore, personnel time and device setup times may be saved to a substantial extent. In prior art, cable pull potentiometers are used for this purpose, for example, allowing for the detection of the positions of the individual adjustable elements. In general, cable pull potentiometers are used for measuring the vertical and horizontal table positions. However, cable pull sensors are sometimes also used for (indirect) angle detection, since angle sensors often cannot be attached to the rotational axes for reasons of space. The customary cable pull sensors are susceptible to error, however, since the cable, which usually extends in the open and may be readily accessible and exposed to the certain environmental elements, may in the hospital setting become soiled, and is unprotected from mechanical influences, for example, jamming, hooking, or warping.

SUMMARY OF THE DISCLOSURE

It is therefore an object of certain embodiments of the present disclosure to provide a device, wherein the position of at least one movable component of the operating table can be reliably detected.

This and other objectives may be achieved by a device for detecting the position of movable operating table components, comprising a multilayer sensor film that is attached to a first operating table component and a slider that is mounted on a second operating table component which is movable relative to the first operating table component, the slider being equipped with a pressure piece that elastically compresses the multilayer sensor film. Components which are susceptible to wear and difficult to maintain, clean and disinfect, for example cables, can therefore be fully or partially omitted. Instead, a smooth easily cleanable sensor film and an equally easily disinfectable slider may be used. Furthermore, the device may have an electrical circuit which generates a signal in accordance with the position of the pressure piece on the sensor film. The relative position of the first and second operating table components can therefore be determined precisely, and the signal generated by the electrical circuit can be output to a control unit having table movement and position controls, for example, to monitor and control the movement of the operating table components.

According to some embodiments, the electrical circuit can comprise a potentiometer circuit, so that the position of the pressure piece on the sensor film represents an adjustable voltage tap. The position of the pressure piece may be accurately determined by such a voltage distribution on an electrically conductive resistance coating.

According to some embodiments, the multilayer sensor film may have an upper and a lower layer, which are each provided with electrically conductive coatings, and wherein an elastically compressible intermediate layer is arranged between the upper and the lower layer. An electrical contact can thus be achieved between the respective electrically conductive coatings at the position of the pressure piece by compression of the intermediate layer, while at the positions at which the pressure piece is not in contact with the sensor film, bad contacts between the respective layers are prevented by the non-compressed intermediate layer.

According to some embodiments, a spring can be provided to elastically press the pressure piece of the slider against the sensor film. The intermediate layer is thus elastically compressed, and the electrically conductive coatings of the upper and lower layer are brought into electrical contact with one another at the position of the pressure piece. A potentiometer may therefore be implemented in a mechanically simple and robust manner by sensor film, pressure piece, and spring such as a spring (e.g., a spring rod, washer, diaphragm, wire and/or plate).

According to some embodiments, the slider may comprise a lower part and an upper part, respectively arranged on opposite sides of the sensor film, wherein the upper part may be fastened on the lower part, and may have apertures for the sensor film on opposite sides. The slider may thus have a particularly simple structure and be easily fastened to the sensor film, by firstly arranging the lower part on one side of the sensor film, and subsequently placing the upper part onto the sensor film from the other side and fastening it on the lower part, the sensor film extending through the apertures in the upper part.

For this purpose, a spring may be attached to the upper part, wherein the spring may be designed such that it exerts a force on the pressure piece in the direction of the lower part. The sensor film can therefore be compressed between the pressure piece and the lower part by the spring attached to the upper part. Such springs may be in the form of spring washers, flexible wires, flexible plates, diaphragms, etc.

According to some embodiments, the upper part may comprise a frame. In this case, the pressure piece may comprise a tongue or cantilevered structure, formed in one piece with the frame and located inside an opening enclosed by the frame. The upper part and the pressure piece may thus be integrally formed, allowing for a simple and cost-effective production and installation of the slider. The sensor film can therefore be compressed inside the frame of the upper part between the pressure piece and the lower part, whereby a precisely defined contact point is generated between the pressure piece and the sensor film held in the frame of the slider.

According to some embodiments, the slider may have a total height in a direction perpendicular to a plane of the sensor film of less than 15 mm, more preferably less than 12 mm, and preferably at most 10.6 mm. Other heights such as less than 8 mm may also be realized. The flat construction allows for the use of the device even in constricted installation spaces.

According to some embodiments, the device may furthermore comprise a hydraulic adjusting element such as a hydraulic cylinder for adjusting the second operating table component relative to the first operating table component, the sensor film being attached to a first structural part of the hydraulic adjusting element (e.g., a cylinder or piston portion of a hydraulic piston/cylinder assembly) and the slider being attached to a second structural part of the hydraulic adjusting element (e.g., the other of the piston/cylinder assembly). The above-described device can thus be combined with a hydraulic cylinder mechanism for adjusting operating table components, wherein, for example, the sensor film may be attached to a hydraulic cylinder and the slider to a piston rod of the hydraulic cylinder, or vice versa. Instead of a hydraulic adjusting element, electrical, pneumatic, or mechanical adjusting elements may also be provided, wherein the device for position detection may then be attached to respective structural parts of the electrical, pneumatic, or mechanical adjusting element.

According to a further aspect, an operating table is provided, comprising a patient bearing surface having a first component and at least one second component that is movable relative to the first component. The components of the bearing surface may, for example, be a back plate, a head plate, leg plates, or other sections of a patient bearing surface. Furthermore, the operating table comprises at least one hydraulic adjusting element such as a hydraulic cylinder for moving the second component relative to the first component, and at least one device for position detection as described above, which is attached to the hydraulic adjusting element and which is designed to determine the position or orientation of the second component relative to the first component.

According to some embodiments, the operating table may further comprise a control unit for controlling the movement of the at least one second component relative to the first component. It may be provided that the device for position detection emits a position signal to the control unit. The position signal may be, for example, be a voltage signal or a plurality of voltage signals from which the control unit may determine a relative position of the two components of the operating table. The control unit will therefore be able to monitor and control the relative position of the two components, and thus implement collision monitoring of the operating table components with one another and with other structures, and also access stored positions of the operating table components.

BRIEF DISCRIPTION OF THE DRAWINGS

Exemplary embodiments of the present invention will be described hereafter with reference to the appended drawings, in which identical reference signs identify respectively identical or corresponding elements.

DETAILED DESCRIPTION

In the following description, exemplary embodiments of the present disclosure are described with reference to the drawings. The drawings are not necessarily to scale, but merely intended to schematically illustrate the respective features. It should be noted that the features and components described hereafter may be respectively combined with one another, independently of whether they have been described in the context of a single embodiment. The combination of features in the respective embodiments merely serves to illustrate the fundamental structure and the functionality of the claimed device. Although certain embodiments of the invention are specifically described herein, one of ordinary skill in the art will readily recognize that the same principles are equally applicable to, and can be employed in other systems and methods. Before explaining the disclosed embodiments of the present invention in detail, it is to be understood that the invention is not limited in its application to the details of any particular embodiment shown. Additionally, the terminology used herein is for the purpose of description and not of limitation. Further, it must be noted that as used herein and in the appended claims, the singular forms "a", "an", and "the" include plural references unless the context clearly dictates otherwise. As well, the terms "a" (or "an"), "one or more" and "at least one" can be used interchangeably herein. It is also to be noted that the terms "comprising," "including," "composed of," and "having" can be used interchangeably.

Figure 1:
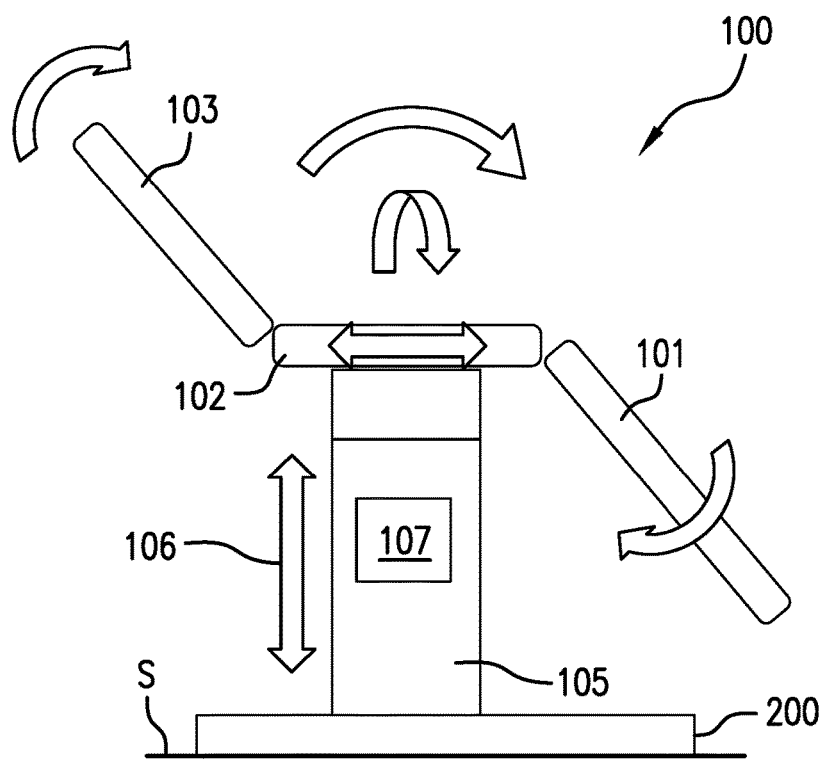
FIG. 1 shows a schematic view of an operating table having movable components.

FIG. 1 shows a schematic view of an operating table 100, which is modularly constructed and comprises multiple movable components. For example, an operating bearing surface of the operating table 100 may be divided into multiple parts, into one or more leg plates 101, one or more hip plates 102, and one or more back plates 103. According to further embodiments, one or more head plates and/or further components may additionally be provided. These components 101-103 may each be movable relative to one another and relative to a base 105 of the operating table 100. The base 105 may have a lifting mechanism 106 for setting the height of the operating table 100.

As schematically shown in FIG. 1 by the respective arrows, a plurality of different movement axes may be provided in each of the components 101-103, for example, to set the inclination or tilt of individual components relative to one another and/or the base 105, and to set multiple angle functions, for example, for head, chest, and legs relative to each other or the base 105. Furthermore, the components 101-103 may be moveable relative to the base 105 in the longitudinal direction of the operating table (e.g., generally moveable horizontally). Additionally, while base 105 is draw as a column that may rest or be mounted to a ground surface or floor surface, it may also take on the form of a column mounted to a base platform 200 that is also moveable with respect to a floor surface S, for example by wheeled movement of the base platform and the column shaped base 105 extending between the base platform and the patient support surface.

The movements for lift, longitudinal displacement, and/or tilting the back plate 103 and/or the leg plates 101 may be generated by motors, wherein hydraulic or electrical systems can be used. A control unit 107 may be housed in the base 105 in order to control the movement of the components 101-103. To detect and analyze the settings and positions of the individual movable components, sensors and devices as described hereafter are used according to some embodiments.

Figure 2:
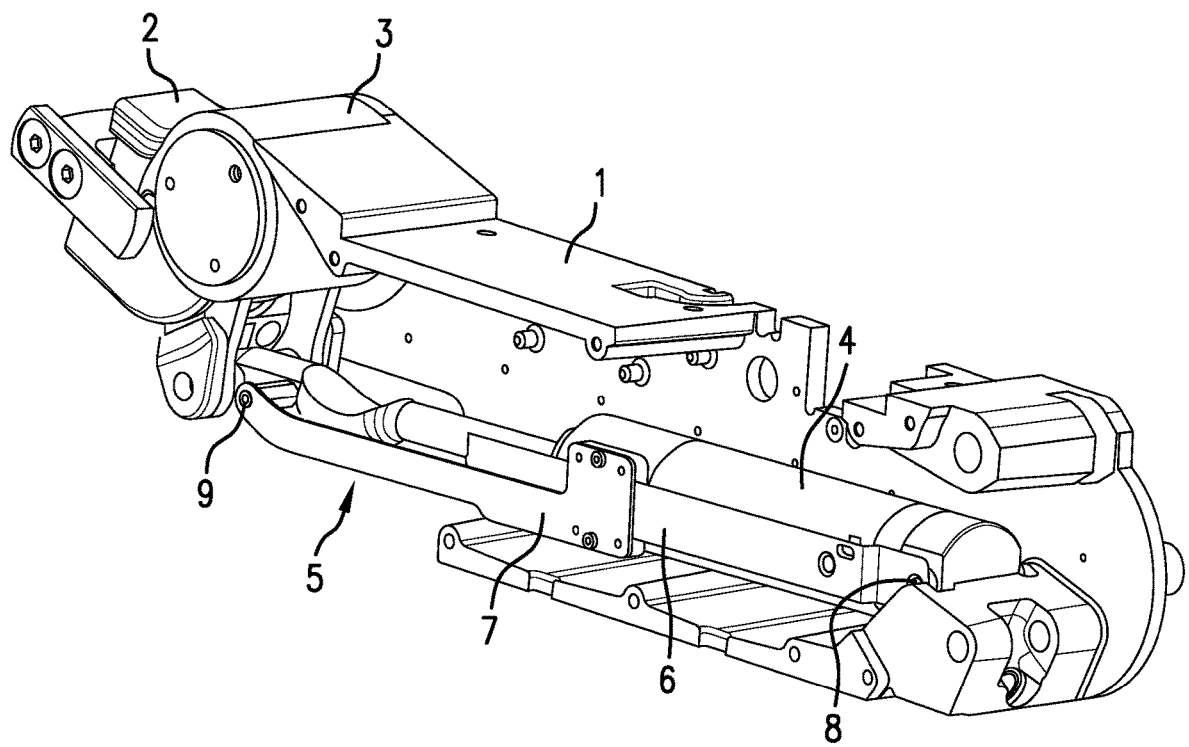
FIG. 2 shows a view of a first embodiment of a device according to the present disclosure.

FIG. 2 shows a device by which the relative movement of two components 1 and 2, which are connected to one another via a joint 3, can be generated and measured. The components 1 and 2 shown in FIG. 2 may be any arbitrary pair of the components 101-103 of the operating table shown in FIG. 1 or another operating table. In the embodiment shown in FIG. 2, a hydraulic cylinder 4 is used as a drive element of the adjustment movement. However, it is also conceivable that an electrical, pneumatic, or mechanical drive is provided.

The adjustment movement generated by the hydraulic cylinder 4 is determined by a film sensor 5. The film sensor 5 comprises a sensor film 6 and a slider 7. In the embodiment shown, the sensor film 6 is connected at a first fastening position 8 to the piston side of the hydraulic cylinder 4 and the slider 7 is attached at a second fastening position 9 to the rod side of the hydraulic cylinder 4. When the hydraulic cylinder 4 extends or retracts, the two sensor parts 6, 7 move relative to one another.

Figure 3:
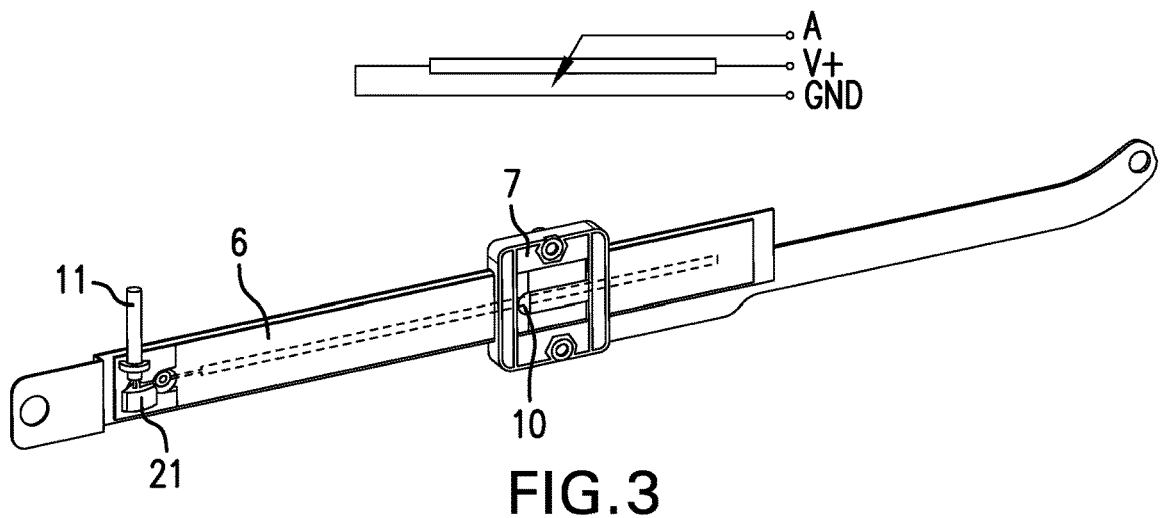
FIG. 3 shows a circuit diagram and a detail view of the device shown in FIG. 2.
Figure 3A:
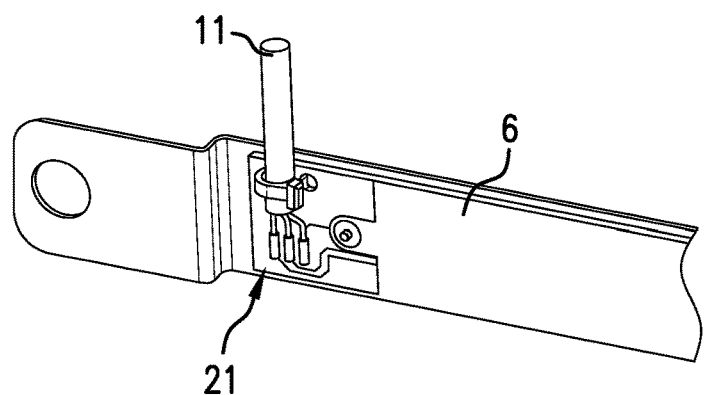
FIG. 3a shows a detail view of the device shown in FIG. 3.

The film sensor 5 functions here according to the principle of a film potentiometer, as shown in the circuit diagram depicted at the top in FIG. 3: a conductor track is printed onto a respective upper and a respective lower layer on the multilayer sensor film 6, an elastically compressible intermediate layer being arranged between the two conductor tracks. At the contact point 10 of the slider 7, a voltage signal is tapped and supplied via a three-core signal line 11, for example, to the control unit 107 of the operating table 100 (see FIG. 1). Solder connections of the cable and the resistors for the conduction monitoring are arranged below a cover in a terminal region 21, see also FIG. 3a. As is apparent from the circuit diagram of FIG. 3, the terminals A, V+, and GND are respectively connected to one core of the three-core signal cable 11. The value of the voltage signal A continuously changes along the movement path of the slider 7. Using this starting value, the present, extended length of the hydraulic cylinder 4 (see FIG. 2) can be computed, by way of which, in turn, the adjustment angle of the corresponding operating table components 101-103 can be determined.

In the present embodiment, the voltage signal is conducted via a three-core signal line 11 to the control unit 107. The terminal of the signal line 11 on the film sensor 5 may be arranged close to the pivot point or fastening point 8 of the sensor film 6 on the hydraulic cylinder 4. The length changes of the line 11 due to the movement of the joints are thus also very small and the line routing can be embodied in a space-saving manner.

The controller may be implemented as a control unit, which may be arranged in the base 105 of the operating table 100, for example. With the position signals supplied via the corresponding signal lines 11, the control unit can carry out collision monitoring of the components 101-103 of the operating table or direct the movement of the components 101-103 into previously stored positions, to move the patient into a respective desired support position for specific operations and treatments.

Figure 4:
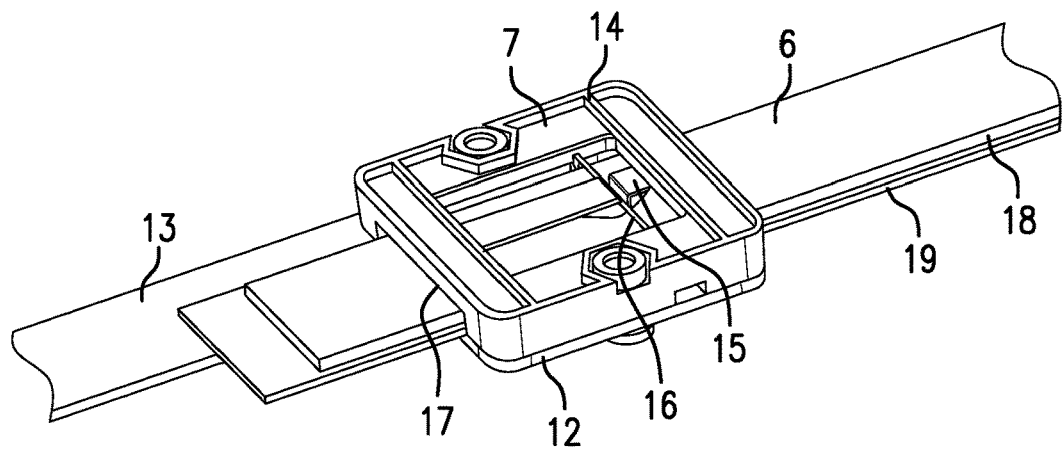
FIG. 4 shows a view of the slider of the device shown in FIG. 2.
Figure 5:
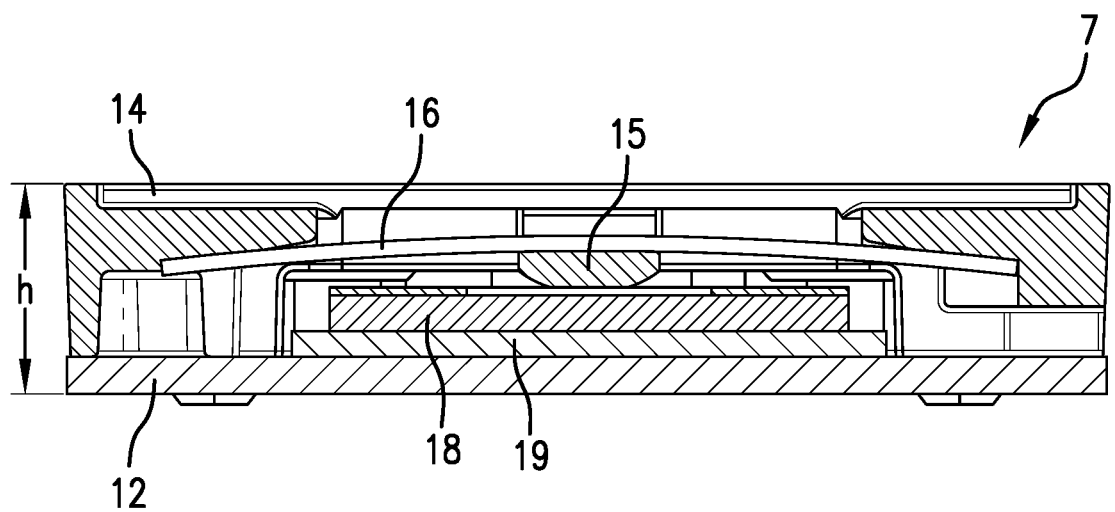
FIG. 5 shows a cross section of a slider according to one embodiment of the device according to the present disclosure.

FIGS. 4 and 5 show an embodiment of the slider 7. The slider 7 comprises a lower part 12, which may be formed in one piece with an arm 13 extending from the lower part 12 to the fastening position 9 (see FIG. 2) of the slider 7. An upper part 14, embodied in the embodiment shown as a frame, is fastened on the lower part 12. A pressure piece 15, which may be formed in one piece with the frame 14, is arranged inside this frame 14. In the embodiment shown in FIGS. 4 and 5, the pressure piece 15 is designed as a tongue or cantilever, which is connected on one side to the frame 14 and protrudes into the middle of the frame 14. A spring such as a spring rod or wire 16 is fastened to the frame, to press the pressure piece 15 in the direction of the lower part 12. Recesses 17 are provided in opposing side walls of the frame 14, which form apertures for the sensor film 6 between the upper part 14 and lower part 12 of the slider 7.

FIG. 4 also shows the structure of the sensor film 6 having an upper layer 18 and a lower layer 19. As is apparent in the circuit diagram shown at the top in FIG. 3, the upper layer 18 comprises an electrical conductor track A, which is brought by the pressure piece 15 into contact with a resistance material on the lower layer 19, to which, as shown in the circuit diagram in FIG. 3, a voltage V+ is applied. A robust potentiometer arrangement is thus implemented by the sensor film 6 and the pressure piece 15, which is insensitive to dust and dirt, and in which the respective electrical conductor tracks and resistance materials are protected from abrasion and wear, since they are not in direct contact with the surroundings or with movable elements. Instead, the pressure piece 15, which may be produced from a plastic material, for example, and the lower part 12 of the slider 7 move on the respective rear sides of the layers 18, 19 of the sensor film 6 that feature electrically conductive coatings.

As shown in the cross-sectional view of FIG. 5, the spring component (or spring wire) 16 is supported in this embodiment at each of its two ends in recesses in the frame 14 and is then tensioned via the pressure piece 15 such that the required contact pressure of the pressure piece 15 on the sensor film 6 is generated. The slider 7 according to the embodiment shown is a flatly constructed plastic part which generates the required contact pressure by way of a transversely inserted spring rod 12. The height h in the embodiment shown is less than 10.6 mm, so that the slider 7 can also be used in constricted installation spaces.

Figure 6:
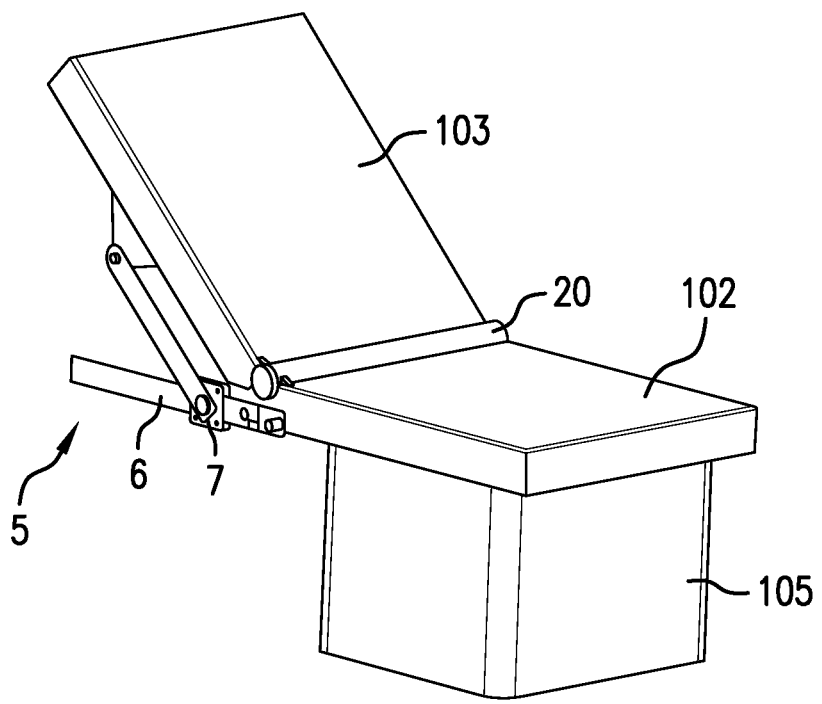
FIG. 6 shows an example of a use of an embodiment of the device according to the present disclosure.

As shown in FIG. 6, according to some embodiments, a device for detecting positions may also be used with a film sensor 5 as described above with axially arranged actuators 20. In the example shown in FIG. 6, the back plate 103 can be adjusted relative to the hip plate 102 by an axially arranged actuator 20. However, it is also conceivable that axially arranged actuators be arranged at other positions and between other components of the operating table.

For example, an electrical, hydraulic, or pneumatic drive may be provided here in or on the actuator 20, or it may be provided that in the embodiment shown in FIG. 6, the back plate 103 can be manually adjusted relative to the hip plate. The position of the back plate 103 can be detected rapidly and precisely by the film sensor 5, even in the event of a manual adjustment. Based on the detected positions, for example, a user may be notified by acoustic or optical signals when a predetermined position of the back plate 103 is reached, or the user may be warned of an imminent collision.

In the embodiment shown in FIG. 6, the slider 7 is rotatably installed, so that it can travel along the sensor film 6. This can be implemented, for example, by a rotatable connection between the lower part 12 and the arm 13 of the slider 7 (see FIG. 4). The signal values which are emitted by the signal line 11 depend in this embodiment on the angle setting of the elements.

Using the above-described device for detecting positions, a precise determination of the relative position of two relatively adjustable components is possible, for example, in an operating table having adjustable back, leg, head, and hip plates. The use of film sensors substantially increases the reliability of the distance recording assembly. The common cable pull potentiometers are much more vulnerable. The cable, which is usually exposed, may become soiled and introduce particles into the potentiometer enclosure. The film sensors, in contrast, are insensitive to dust, small particles, moisture, and oil.

The flat construction of the slider also allows for use in constricted installation spaces. Due to the simple structure of the slider, it is cost-effective to produce and simple to install. All components of the slider are easily accessible for cleaning and disinfection.

The electrically conductive coatings and materials are substantially protected against mechanical influences in the device for detecting positions, so that abrasion and wear are reduced as compared to common cable pull potentiometers. By way of movable parts, the device for detecting positions comprises a simple slide guide of the slider on the sensor film, requiring no restoring elements. The above-described device therefore has a particularly simple structure, it can therefore be manufactured in a cost-effective way, and it has a low susceptibility to wear.

Although various embodiments of the present invention have been described and shown, the invention is not restricted thereto, but may also be embodied in other ways within the scope of the subject-matter defined in the following claims.

The invention claimed is:

1. A device for detecting the position of movable operating table components, the device comprising:
   a multilayer sensor film attached to a first operating table component;
   a slider attached to a second operating table component, the slider is movable relative to the first operating table component and is equipped with a pressure piece that elastically compresses the multilayer sensor film; and
   an electrical circuit comprising a potentiometer circuit, which generates a signal in accordance with the position of the pressure piece on the sensor film,
   wherein the multilayer film sensor comprises an upper layer, a lower layer, and an elastically compressible intermediate layer arranged between the upper and the lower layers,
   wherein the upper and lower layers of the multilayer film sensor each have electrically conductive coatings, and
   wherein electrical contact between the upper and lower layers of the multilayer film sensor is achieved by compression of the intermediate layer at the position at which the pressure piece is in contact with the multilayer sensor film.

2. The device of claim 1, wherein a spring is provided to elastically press the pressure piece of the slider against the sensor film, the intermediate layer being elastically compressed and the electrically conductive coatings of the upper and lower layers being brought into electrical contact with one another at the position of the pressure piece.

3. The device of claim 2, wherein the slider comprises a lower part and an upper part, arranged on opposite sides of the sensor film, the upper part being fastened on the lower part, and having apertures for the sensor film on opposite sides.

4. The device according to claim 3, wherein the spring is attached to the upper part.

5. The device of claim 3, wherein the upper part comprises a frame and the pressure piece comprises a cantilevered extension.

6. The device of claim 5, wherein a tongue is formed in one piece with the frame and is located inside an opening enclosed by the frame.

7. The device of claim 1, wherein the slider has a total height in a direction perpendicular to a plane of the sensor film of less than 15 millimeters.

8. The device of claim 1, wherein the slider has a total height in a direction perpendicular to a plane of the sensor film that is less than or equal to 10.6 millimeters.

9. The device of claim 1, further comprising a hydraulic adjusting element for adjusting the second operating table component relative to the first operating table component.

10. The device of claim 9, wherein the hydraulic adjusting element comprises a piston and a hydraulic cylinder.

11. The device of claim 10, wherein the sensor film is attached to one of the piston and the hydraulic cylinder, and the slider is attached to the other of the piston and the hydraulic cylinder such that movement of the piston with respect to the cylinder causes movement of the sensor film with respect to the slider.

12. The device of claim 9, wherein the sensor film is attached to a first structural part of the hydraulic adjusting element and the slider is attached to a second structural part of the hydraulic adjusting element.

13. An operating table, comprising:
   a bearing surface having a first component and at least one second component that is movable relative to the first component,
   at least one hydraulic adjusting element for moving the second component relative to the first component, and
   at least one multilayer film sensor for detecting a position based on a potentiometer circuit, wherein the multilayer film sensor is attached to the hydraulic adjusting element and is configured to determine the position of the second component relative to the first component,
   wherein the multilayer film sensor comprises an upper layer, a lower layer, and an elastically compressible intermediate layer arranged between the upper and the lower layers,
   wherein the upper and lower layers of the multilayer film sensor each have electrically conductive coatings, and
   wherein electrical contact between the upper and lower layers of the multilayer film sensor is achieved by compression of the intermediate layer.

14. The operating table of claim 13, further comprising a control unit for controlling the movement of the at least one second component relative to the first component, wherein the device for position detection emits one or more position signals to the control unit.

15. A method of operating an operating table, the method comprising the steps of:
- receiving within a control unit of the operating table one or more electrical measurements associated with an output of a multilayer film sensor; and
- controlling with the control unit a movement of the operating table based on the step of receiving within the control unit of the operating table the one or more electrical measurements,
- wherein the multilayer film sensor comprises a potentiometer circuit and includes an upper layer, a lower layer, and an elastically compressible intermediate layer arranged between the upper and the lower layers,
- wherein the upper and lower layers of the multilayer film sensor each have electrically conductive coatings, and
- wherein electrical contact between the upper and lower layers of the multilayer film sensor is achieved by compression of the intermediate layer.

\* \* \* \* \*